United States Patent [19]

Tenud et al.

[11] Patent Number: 4,558,158
[45] Date of Patent: Dec. 10, 1985

[54] PROCESS FOR THE PRODUCTION OF 4-(TRIALKYLAMMONIUM)-ACETOACETARYLIDES

[75] Inventors: Leander Tenud; Synèse Jolidon, both of Visp, Switzerland

[73] Assignee: Lonza Ltd., Gampel/Valais, Switzerland

[21] Appl. No.: 501,898

[22] Filed: Jun. 7, 1983

[30] Foreign Application Priority Data

Jun. 18, 1982 [CH] Switzerland .................. 3769/82

[51] Int. Cl.$^4$ .............................................. C07C 91/42
[52] U.S. Cl. ...................................... 564/194; 564/200
[58] Field of Search .............................. 564/194, 200

[56] References Cited

U.S. PATENT DOCUMENTS

| | | | |
|---|---|---|---|
| 3,014,046 | 12/1961 | Speziale | 564/194 |
| 4,015,013 | 3/1977 | Passedouet et al. | 424/324 |
| 4,360,465 | 11/1982 | Buschmann et al. | 548/568 |
| 4,497,735 | 2/1985 | Olsen et al. | 534/603 |

FOREIGN PATENT DOCUMENTS

| | | | |
|---|---|---|---|
| 0017946 | 10/1980 | European Pat. Off. | 564/194 |
| 2214488 | 10/1972 | Fed. Rep. of Germany . | |
| 3236669 | 4/1983 | Fed. Rep. of Germany . | |
| 2112797 | 7/1983 | United Kingdom | 564/194 |

OTHER PUBLICATIONS

"Cyclization of 2-(Γ-Bromaacetoacetamido) Pyridine Derives" *Heterocycles* vol. 14, (11) (1980) pp. 1779-1784.

Topham, A., "Dispersing Agents for Pigments In Organic Liquids", *Progress In Organic Coatings*, 5, (1977), pp. 237 to 243.

Lubs, "The Chemistry of Synthetic Dyes and Pigments", (1955), pp. 670 and 671.

*Primary Examiner*—Anton H. Sutto
*Assistant Examiner*—John A. Sopp
*Attorney, Agent, or Firm*—Fisher, Christen & Sabol

[57] ABSTRACT

Process for the production of 4-(trialkylammonium)-acetoacetarylides having the formula:

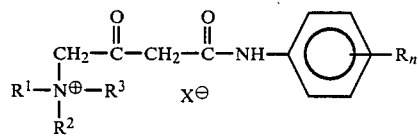

wherein R is H, a lower alkyl, —OCH$_3$, —OC$_2$H$_5$, —Cl, —Br, —NO$_2$, —NHCOCH$_3$ or an anilated heterocyclic ring; n is 1 to 3; R$^1$, R$^2$ and R$^3$ each is an alkyl having 1 to 18 C atoms; and X is Cl or Br. Such arylide is prepared by reacting a corresponding trialkylamine with a corresponding 4-haloacetoacetarylide at a low temperature in the presence of an organic solvent.

8 Claims, No Drawings

PROCESS FOR THE PRODUCTION OF 4-(TRIALKYLAMMONIUM)-ACETOACETARY-LIDES

BACKGROUND OF THE INVENTION

1. Field of the Invention

The invention relates to a process for the production of 4-(trialkylammonium)-acetoacetarylide having the formula:

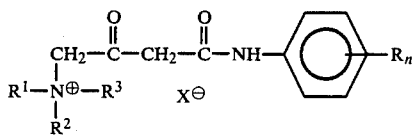

wherein: R is H, a lower alkyl, —OCH$_3$, —OC$_2$H$_5$, —Cl, —Br, —NO$_2$, —NHCOCH$_3$ or an anilated heterocyclic ring; n is 1 to 3; R$^1$, R$^2$ and R$^3$ each is an alkyl having 1 to 18 C atoms; and X is Cl or Br.

2. Prior Art

Pigments in the course of their production process aggregate more or less extensively into larger agglomerates. During the working-in of the pigments into the medium of use, the agglomerates must—as far as possible—be split up into their individual components. Almost all characteristics, durability and fastness are influenced by the degree to which one succeeds in deagglomerating the pigments.

In order to improve the capacity of the pigments for dispersion, additives have been added to the pigments during their production. Such hyper-dispersing agents can be, for example, nonpolar systems of polyhydroxystearic acid compounds. For polar systems, polymers, copolymers, longer-chained polyurea compounds, polyacidic esters and quaternary ammonium sulfates, among others, have been used (*Progress In Org. Coatings*, 5, (1977), 237–243).

In the case of the azoacetoacetarylamide, in order to improve its capacity for dispersion, a part of the finished pigment has been reacted with primary amines. At the same time the keto group in the pigment is converted with the amine into Shiff's base (*Progress In Org. Coatings*, 5, (1977), 241). The system is imbued with the disadvantage that, on the one hand, it still contains traces of unreacted amine and on the other hand, its capacity for dispersion can be decreased again (flocculations) whenever the Schiff's base is split by hydrolysis.

BROAD DESCRIPTION OF THE INVENTION

An object of the invention is to provide processes, pigment products and compositions which eliminate the above-stated processes of the above-stated prior art systems. Other objects and advantages of the invention are set out herein or are obvious herefrom to one ordinarily skilled in the art.

The objects and advantages of the invention are achieved by the process and compositions of the invention. One of the ways in which the invention achieves its objects and advantages is by making the acetoacetarylide coupling component dispersable as such.

The invention involves a process for the production of such 4-(trialkylammonium)-acetoacetarylides having the formula:

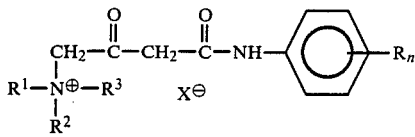

wherein: R is H, a lower alkyl, —OCH$_3$, —OC$_2$H$_5$, —Cl, —Br, —NO$_2$, —NHCOCH$_3$ or an anilated heterocyclic ring; n is 1 to 3; Rhu 1, R$^2$ and R$^3$ each is an alkyl having 1 to 18 C atoms; and X is Cl or Br. The process includes reacting a corresponding trialkylamine with a corresponding 4-haloacetoacetarylide.

Advantageously the trialkylamine compounds are those wherein R$^1$ and R$^2$ are the same or differnt and are alkyls having 1 to 4 carbon atoms and R$^3$ is an alkyl having 6 to 18 carbon atoms. Preferably the organic solvent is an aprotic solvent and preferably the aprotic solvent is a polar aprotic solvent. Preferably the reaction step is operated at a temperature from −10° to +50° C. Also, preferably the reaction step is operated with an excess of trialkylamine. 4-Chloro- or 4-bromo-derivatives are preferably used as the 4-haloacetoacetarylides.

The process of the invention is particularly effective in producing 4-dimethyldodecylammonium-acetoacetanilide chloride by reacting 4-chloroacetoacetanilide with 1.1 to 1.6 equivalents of diemthyldodecylamine in a polar aprotic solvent at a temperature of 0° to 30° C. The product is then isolated.

The products of the processes of the invention are pigments which are readily dispersible in nonagglomerated form.

The invention includes 4-(trialkylammonium)-acetoacetarylides having the formula:

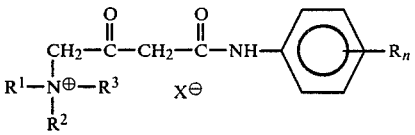

wherein: R is H, a lower alkyl, OCH$_3$, —OC$_2$H$_5$, —Cl, —Br, —NO$_2$, —NHCOCH$_3$ or an anilated heterocyclic ring; n is 1 to 3; R$^1$, R$^2$ and R$^3$ each is an alkyl having 1 to 18 C atoms; and X is Cl or Br. Preferably R$^1$ and R$^2$ each are an alkyl group having 1 to 4 C atoms, and R$^3$ is an alkyl group having 8 to 18 carbon atoms.

The invention further involves a composition which includes:

(a) a 4-haloacetoacetarylide having the formula:

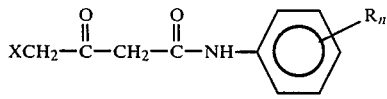

wherein: R is H, a lower alkyl, —OCH$_3$, —OC$_2$H$_5$, —Cl, —Br, —NO$_2$, —NHCOCH$_3$ or an anilated heterocyclic ring; n is 1 to 3; and X is Cl or Br;

(b) a trialkylamine having the formula:

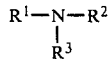

wherein $R^1$, $R_2$ and $R^3$ is an alkyl having 1 to 18 C atoms; and (c) an organic solvent.

Preferably the organic solvent is an aprotic solvent, and preferably the aprotic solvent is a polar aprotic solvent. The triamine is preferably present in a molar amount greater than the molar amount in which the 4-haloacetoacetarylide is present. Preferably $R^1$ and $R^2$ each are an alkyl group having 1 to 4 C atoms and $R^3$ is an alkyl group having 8 to 18 C atoms.

DETAILED DESCRIPTION OF THE INVENTION

As used herein, all parts, percentages, ratios and proportions are on a weight basis unless otherwise stated herein or otherwise obvious herefrom to one ordinarily skilled in the art.

As defined herein, unless otherwise stated, a lower alkyl group has 1 to 8 carbon atoms. Examples of saturated lower alkyl groups are methyl, ethyl, propyl, isopropyl, butyl, isobutyl, tertiary butyl, pentyl, isoamyl, 2-pentyl, 3-pentyl, 2-methyl-2-butyl, 1-hexyl, 2-methyl-1-pentyl, 3-methyl-1-pentyl, 2-ethyl-1-butyl, 2-hexyl, 3- hexyl, 2-methyl-2-pentyl, 1-heptyl, 2,4-dimethyl-1-pentyl, 1-octyl and 2-octyl.

The trialkylamines used in the invention have the formula:

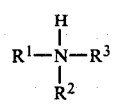

wherein $R_1$, $R_2$ and $R_3$ are the same as defined above. Examples of such trialkylamines are dimethylhexylamine, dimethyldodecylamine, dimethyloctadecylamine, etc. Examples of $R^1$, $R^2$ and $R$ are methyl, propyl, isopropyl, butyl, isobutyl, tertiary butyl, pentyl, isoamyl, 2-pentyl, 3-pentyl, 2-methyl-2-butyl, 1-hexyl, 2-methyl-1-pentyl, 3-methyl-1-pentyl, 2-ethyl-1-butyl, 2-hexyl, 3-hexyl, 2-methyl-2-pentyl, 1-heptyl, 2,4-dimethyl-1-pentyl, 1-octyl, 2-octyl, 1-nonyl, 1-decyl, 1-undecyl, 1-dodecyl, 1-tridecyl, 1-tetradecyl, 1-pentadecyl, 1-hexadecyl, 1-heptadecyl and 1-octadecyl.

The 4-haloacetoacetarylides used in the invention have the formula:

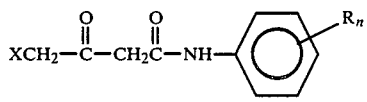

wherein R, n and X are the same as defined above. Preferably the 4-chloro or 4-bromo derivatives are used. The acetoacet arylide radicals are preferably those which are known as coupling compounds in the case of the known pigments. Examples of the 4-haloacetoacetarylides are 4-haloacetoacetanilide, 4-haloacetoacet-o-chloroanilide, 4-haloacetoacet-o-anilide, 4-haloacetoacet-o-toluidide, 4-haloacetoacet-m-xylidide, 4-haloacetoacet-p-anisidide, 4-haloacetoacet-p-toluidide, 4-haloacetoacet-p-phenetidide, 4-haloacetoacet-2-methyl-4-chloroanilide, 4-haloacetoacet-2,4-dimethoxyanilide, 4-haloacetoacet-2,5-dimethoxyanilide, 4-haloacetoacet-2-methoxy-5-chloranilide, 4-haloacetoacet-2,5-dimethoxy-4-chloranilide, 4-haloacetoacet-p-nitroanilide, 4-haloacetoacet-3-chloranilide, 4-haloacetoacete-2-ethyl-6-methylanilide, 4-haloacetoacet-2,6-dimethylanilide, etc.

The new pigment compounds of the invention are produced by reaction of the pertinent 4-haloacetoacetarylides with the corresponding trialkylamines at a temperature of $-10°$ to $+50°$ C. in the presence of an organic solvent. Preferably a temperature of 0° C. to 30° C. is used. It is advantageous to use the trialkylamine in excess; effectively 1.1 to 1.6 mole of trialkylamine per mole of arylide is used.

In general the effective organic solvents are the organic solvents which do not have any OH-groups, although organic solvents containing OH-groups, such as, methanol and ethanol, can also be used. By using solvents free of OH groups, the isolation of the end-products is simpler and the yields are higher. Examples of such solvents are aromatic hydrocarbons, such as, benzene and toluene, and chlorinated hydrocarbons, such as, carbon tetrachloride, dichloroethane, trichloroethane, tetrachloroethane, chlorobenzene, dichlorotoluene, chloroform and dichloromethane.

It is particularly effective, especially whenever it is a matter of introducing the preferred diloweralkyl-monohigheralkyl-amine radicals, to use a solvent which is a polar aprotic solvent, such as, ethyl acetate, acetonitrile, acetone, dimethyl formamide, dimethyl sulfoxide, hexamethyl phosphoric acid triamide, etc.

EXAMPLE 1

A mixture of 8.45 g (40 m mole ) of 4-chloroacetoacetanilide, 11.1 g (50 m mole) of dimethyldodecylamine and 85 ml of acetonitrile was stirred at ambient temperature. After a few minutes a clear solution developed. Stirring of the solution continued for 3 days at ambient temperature, whereby the product was precipitated after some time. The reaction mixture was cooled to 0° C., and the precipitate was drained off. The product was washed with 10 ml of ice-cold acetonitrile. After drying in a drying cabinet at ambient temperature, 10.6 g (63.7 percent) of slightly yellow crystals of a mixture of 4-(dimethyldodecylammonium)-acetoacetanilide chloride and its inner salt was obtained. The mixture had a melting point of 128° to 131° C. and a content of 99.9 percent.

EXAMPLE 2

A mixture of 8.45 g (40 m mole) of 4-chloroacetoacetanilide, 11.1 g (50 m mole) of dimethyldodecylamine and 60 ml of ethyl acetate was stirred for 3 days at ambient temperature. The reaction mixture was cooled to 5° C. The resultant precipitate was drained off and washed with 10 ml of ice-cold ethyl acetate. After drying, 14.4 g (85 percent) of slightly yellow crystals of 4-(dimethyldodecylammonium)-acetoacetanilide chloride was obtained. The product had a melting point of 128° to 132° C. and a content of 100.3 percent (TBAH).

EXAMPLE 3

A mixture of 9.0 g (40 m mole) of 4-chloroacetoacet-o-toluidide, 6.7 g (52 m mole) of N,N-dimethylhexylamine and 85 ml of ethyl acetate was stirred during 3 days at ambient temperature. The reaction mixture was cooled down to 5° C. The resultant precipitate was drained off and washed with 10 ml of ice-cold ethyl acetate. After drying, 10.3 g (73 percent) of slightly yellowish crystals of 4-(dimethylhexylammonium)-acetoacet-o-toluidide was obtained. The product had a melting point of 158° to 165° C. and a content of 99.4 percent.

EXAMPLE 4

A mixture of 9.75 g (40 m mole) of 4-bromoacetoacetanilide, 11.1 g (50 m mole) of dimethyldodecyl amine and 8.5 ml of acetonitrile was stirred at ambient temperature. After a few minutes a clear solution developed from which the product crystallized out after some time. After allowing this to stand for 3 hours at ambient temperature the crystal paste was drained off and washed again with 10 ml of ice-cold acetonitrile. After drying at ambient temperature in a drying cabinet, 14.5 g (79.3 percent) of yellowish crystals of 4-(dimethyldodecylammonium)-acetoacetanilide bromide was obtained. The product had a melting point of 130° to 132° C. and a content of 99.4 percent.

EXAMPLE 5

63.5 (0.3 mole) of 4-chloroacetoacetanilide was suspended in 140 ml of acetonitrile. The materials were reacted and then treated with 80 g (0.4 mole) of trimethylamine. The mixture was kept at 50° C. for 6 hours while stirring. The clear, yellowish suspension was subsequently evaporated on the rotation evaporator and the residue was suspended in 190 ml of acetone. After the addition of 450 ml of toluene, it was cooled down to 5° C. The product was drained off, washed twice with 50 ml of acetone and dried. Finally, 66.6 g of raw product (melting point 144° to 146° C.) was isolated. The raw product was purified by recrystallization from acetonitrile/ethyl acetate. 49.3 g (61 percent) of colorless crystals of 4-(trimethylammonium)-acetoacetanilide chloride was obtained. The product had a melting point of 160° to 162° C. and a content of 98.6 percent.

EXAMPLE 6

A mixture of 4.0 g (15.5 m mole) of 4-chloroacetoacet-p-nitroanilide, 6.60 g (31 m mole) of dimethyldodecylamine and 100 ml of ethyl acetate was stirred for 2 days at ambient temperature. The reaction mixture was clear at first, becoming cloudy after a few hours. The product crystallized out after some time. The reaction mixture was cooled down to 5° C., the precipitate was drained off and was secondarily washed with 20 ml of cold ethyl acetate. After drying, 3.2 g (44 percent) of yellow crystals of 4-(dimethyldodecyl-ammonium)-acetoacet-p-nitroanilide chloride was obtained. The product had a melting point of 149° C. to 152° C. and a content of 99.8 percent.

EXAMPLE 7

A mixture of 5.0 (20 m mole) of 4-chloroacetoacet-p-phenetidine, 10.2 g (50 m mole) of dimethyldodecylamine and 100 ml of ethyl acetate was stirred at ambient temperature for 10 days. The reaction mixture was cooled down to 5° C., the precipitate was drained off and was washed with 20 ml of cold ethyl acetate. After drying, 6.05 g (64 percent) of colorless crystals of 4-(dimethyldodecylammonium)-acetoacet-p-phenetidide chloride was obtained. The product had a melting point of 168° to 170° C. and a content of 98.8 percent.

EXAMPLE 8

A mixture of 8.45 g (40 m mole) of 4-chloroacetoacetanilide, 15.5 g (52 m mole) of dimethyloctadecylamine and 85 ml of toluene was stirred for 3 days at ambient temperature. The reaction mixture was cooled down to 5° C. The precipitate was drained off, washed with 10 ml of ice-cold ethyl acetate and dried. 17.9 g of raw product (melting point 110° to 118° C.) was isolated. The raw product was purified by recrystallization from ethyl acetate. 11.2 g (55 percent) of slightly yellowish crystals of 4-(dimethyloctadecylammonium)-acetoacetanilide chloride was obtained. The product had a melting point of 137° to 138° C. and a content of 99.6 percent.

By way of summary, the process of the invention involves producing a 4-(trialkylammonium)-acetoacetarylide from a trialkylamine and a 4-haloacetoacetarylide.

What is claimed is:

1. Process for the production of a 4-(trialkylammonium)-acetoacetarylide having the formula:

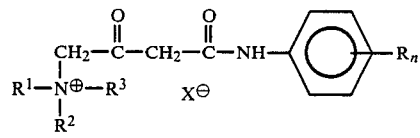

wherein R is H, a lower alkyl, $-OCH_3$, $-OC_2H_5$, $-Cl$, $-Br$, $-NO_2$ and $-NHCOCH_3$; n is 1 to 3; $R^1$, $R^2$ and $R^3$ each is an alkyl having 1 to 18 C atoms; and X is Cl or Br, comprising reacting a 4-haloacetoacetarylide having the formula:

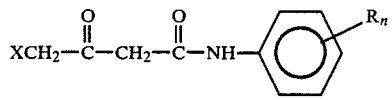

wherein X, R and n have the same definition as above, with a trialkylamine having the formula:

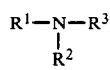

wherein $R^1$, $R^2$ and $R^3$ have the same definition as above, at a low temperature in the presence of an organic solvent.

2. Process as claimed in claim 1 wherein the organic solvent is an aprotic solvent.

3. Process as claimed in claim 1 wherein the aprotic solvent is a polar aprotic solvent.

4. Process as claimed in claim 1 wherein the reaction is conducted at a temperature from $-10°$ to $+50°$ C.

5. Process as claimed in claim 1 wherein the reaction is conducted with a molar excess of the trialkylamine.

6. Process as claimed in claim 1 wherein the 4-haloacetoacetarylide is a 4-chloroacetoacetarylide.

7. Process as claimed in claim 1 wherein the 4-haloacetoacetarylide is a 4-bromoacetoacetarylide.

8. Process for the production of 4-dimethyldodecylammonium-acetoacetanilide chloride comprising reacting 4-chloroacetoacetanilide with 1.1 to 1.6 equivalents of dimethyldodecylamine in a polar aprotic solvent at a temperature of 0° to 30° C. and isolating the resultant 4-dimethyldedecylammonium-acetoacetanilide chloride.

* * * * *